(12) United States Patent
Zhang et al.

(10) Patent No.: US 11,763,156 B2
(45) Date of Patent: Sep. 19, 2023

(54) NEURAL NETWORK COMPRESSION BASED ON BANK-BALANCED SPARSITY

(71) Applicant: Microsoft Technology Licensing, LLC, Redmond, WA (US)

(72) Inventors: Chen Zhang, Beijing (CN); Yunxin Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 885 days.

(21) Appl. No.: 16/686,089

(22) Filed: Nov. 15, 2019

(65) Prior Publication Data

US 2021/0150362 A1 May 20, 2021

(51) Int. Cl.
*G06N 3/08* (2023.01)
*G06N 3/082* (2023.01)

(52) U.S. Cl.
CPC .................... *G06N 3/082* (2013.01)

(58) Field of Classification Search
CPC ................ G06N 3/04; G06N 3/082
See application file for complete search history.

(56) References Cited

U.S. PATENT DOCUMENTS

| | | | |
|---|---|---|---|
| 2007/0022063 A1 | 1/2007 | Lightowler | |
| 2011/0066578 A1 | 3/2011 | Chong et al. | |
| 2018/0046919 A1* | 2/2018 | Li | G06N 3/082 |
| 2021/0125071 A1* | 4/2021 | Ren | G06N 3/04 |
| 2022/0012592 A1* | 1/2022 | Jain | H03M 7/70 |

FOREIGN PATENT DOCUMENTS

| | | |
|---|---|---|
| CN | 101606846 B | 1/2011 |
| CN | 109523017 A | 3/2019 |

OTHER PUBLICATIONS

Chellapilla, et. al., "High Performance Convolutional Neural Networks for Document Processing", In Proceedings of the Tenth International Workshop on Frontiers in Handwriting Recognition, Oct. 23, 2006 (Year: 2006).*

"Sparse Matrix", Retrieved from: https://web.archive.org/web/20190216221659/https://docs.scipy.org/doc/scipy/reference/sparse.html, Feb. 16, 2019, 6 Pages.

(Continued)

*Primary Examiner* — Seokjin Kim
(74) *Attorney, Agent, or Firm* — Schwegman Lundberg & Woessner, P.A.

(57) ABSTRACT

In embodiments of the present disclosure, there is provided an approach for neural network model compression based on bank-balanced sparsity. In embodiments of the present disclosure, a set of weight parameters, such as a weight matrix, in a neural network is divided into a plurality of equal-sized banks in terms of number of elements, and then all of the equal-sized banks are pruned at the same sparsity level. In this way, each pruned bank will have the same number of non-zero elements, which is suitable for hardware speedup. Moreover, since each bank is pruned independently in a fine granularity, the model accuracy can be ensured. Thus, according to embodiments of the present disclosure, the neural network compression method based on bank-balanced sparsity can achieve both high model accuracy and high hardware speedup.

20 Claims, 5 Drawing Sheets

(56) References Cited

OTHER PUBLICATIONS

Aghasi, et al., "Net-trim: Convex Pruning of Deep Neural Networks with Performance Guarantee", In Proceeding of Advances in Neural Information Processing Systems, Dec. 4, 2017, 10 Pages.

Bell, et al., "Efficient Sparse Matrix-vector Multiplication on CUDA", In Nvidia Technical Report NVR-2008-004, Dec. 11, 2008, 32 Pages.

Blundell, et al., "Weight Uncertainty in Neural Networks", In Proceedings of the 32nd International Conference on Machine Learning, Jul. 6, 2015, 10 Pages.

Cao, et al., "Efficient and Effective Sparse LSTM on FPGA with Bank-Balanced Sparsity", In Proceedings of the 2019 ACM/SIGDA International Symposium on Field-Programmable Gate Arrays, Feb. 24, 2019, 10 Pages.

Caulfield, et al., "A Cloud-Scale Acceleration Architecture", In 49th Annual IEEE/ACM International Symposium on Microarchitecture, Oct. 15, 2016, 13 Pages.

Chellapilla, et al., "High Performance Convolutional Neural Networks for Document Processing", In Proceedings of the Tenth International Workshop on Frontiers in Handwriting Recognition, Oct. 23, 2006, 7 Pages.

Choi, et al., "Universal Deep Neural Network Compression", In Journal of Computing Research Repository, Feb. 2018, 5 Pages.

Chu, et al., "CUDA Kernel based Collective Reduction Operations on Large-scale GPU Clusters", In Proceedings of IEEE/ACM 16th International Symposium on Cluster, Cloud and Grid Computing, May 16, 2016, 29 Pages.

Cun, et al., "Optimal Brain Damage", In Proceedings of Advances in Neural Information Processing Systems, 1990, pp. 598-605.

Engelbrecht, Andries P., et al., "A New Pruning Heuristic Based on Variance Analysis of Sensitivity Information", In Journal of IEEE Transactions on Neural Networks, vol. 12, Issue 6, Nov. 2001, pp. 1386-1399.

Fowers, et al., "A Configurable Cloud-Scale DNN Processorfor Real-Time AI", In Proceedings of the 45th Annual International Symposium on Computer Architecture, Jun. 2, 2018, 14 Pages.

Fowers, et al., "A High Memory Bandwidth FPGA Accelerator for Sparse Matrix-Vector Multiplication", Proceedings of the IEEE 22nd International Symposium on Field Programmable Custom Computing Machines, May 11, 2014, 8 Pages.

Gao, et al., "DeltaRNN: A Power-efficient Recurrent Neural Network Accelerator", In Proceedings of the 2018 ACM/SIGDA International Symposium on Field-Programmable Gate Arrays, Feb. 25, 2018, pp. 21-30.

Garofolo, et al., "DARPA TIMIT Acoustic-Phonetic Continuous Speech Corpus CD-ROM", In Journal of NASA STI/Recon technical report n, vol. 93, Feb. 1993, 85 Pages.

Giles, et al., "Pruning Recurrent Neural Networks for Improved Generalization Performance", In Journal of IEEE Transactions on Neural Networks, vol. 5, Issue 5, Sep. 1994, pp. 848-851.

Graves, et al., "Connectionist Temporal Classification: Labelling Unsegmented Sequence Data with Recurrent Neural Networks", In Proceedings of the 23rd International conference on Machine learning, Jun. 25, 2006, pp. 369-376.

Gray, et al., "GPU Kernels for Block-Sparse Weights", Retrieved from: http://openai-assets.s3.amazonaws.com/blocksparse/blocksparsepaper.pdf, Dec. 6, 2017, 12 Pages.

Guo, et al., "Dynamic Network Surgery for Efficient DNNs", In Advances in Neural Information Processing Systems, Dec. 5, 2016, 9 Pages.

Han, et al., "Deep Compression: Compressing Deep Neural Networks with Pruning, Trained Quantization and Huffman Coding", In Journal of the Computing Research Repository, Oct. 1, 2015, pp. 1-14.

Han, et al., "EIE: Efficient Inference Engine on Compressed Deep Neural Network", In Proceedings of the 43rd International Symposium on Computer Architecture, Jun. 18, 2016, pp. 243-254.

Han, et al., "ESE: Efficient Speech Recognition Engine with Sparse LSTM on FPGA", In Proceedings of the ACM/SIGDA International Symposium on Field-Programmable Gate Arrays, Feb. 22, 2017, pp. 75-84.

Han, et al., "Learning both Weights and Connections for Efficient Neural Networks", In Proceedings of Advances in Neural Information Processing Systems, Dec. 7, 2015, pp. 1-9.

Hernandez-Lobato, et al., "Probabilistic Backpropagation for Scalable Learning of Bayesian Neural Networks", In Proceedings of the International Conference on Machine Learning, Jun. 1, 2015, 9 Pages.

Hochreiter, et al., "Long Short-Term Memory", In Journal of Neural Computation, vol. 9, Issue 8, Nov. 15, 1997, pp. 1735-1780.

Jaderberg, et al., "Speeding up Convolutional Neural Networks with Low Rank Expansions", In Journal of Computing Research Repository, May 15, 2014, pp. 1-12.

Jouppi, et al., "In-Datacenter Performance Analysis of a Tensor Processing Unit", In Proceedings of the 44th Annual International Symposium on Computer Architecture, Jun. 24, 2017, pp. 1-12.

Juang, et al., "Speedup of Implementing Fuzzy Neural Networks With High-Dimensional Inputs Through Parallel Processing on Graphic Processing Units", In Journal of IEEE Transactions on Fuzzy Systems, vol. 19, Issue 4, Aug. 2011, pp. 717-728.

Kalchbrenner, et al., "Efficient Neural Audio Synthesis", In Journal of Computing Research Repository, Feb. 23, 2018, 10 Pages.

Krizhevsky, et al., "ImageNet Classification with Deep Convolutional Neural Networks", In Proceedings of Advances in Neural Information Processing Systems, Dec. 3, 2012, pp. 1-9.

Laforest, et al., "Multi-ported Memories for FPGAs via XOR", In Proceedings of the ACM/SIGDA international symposium on Field Programmable Gate Arrays, Feb. 22, 2012, pp. 209-218.

Li, et al., "Pruning Filters for Efficient Convnets", In Journal of Computing Research Repository, Aug. 31, 2016, 13 Pages.

Lin, et al., "Fixed Point Quantization of Deep Convolutional Networks", In Proceedings of the 33rd International Conference on Machine Learning, Jun. 11, 2016, 10 Pages.

Lin, et al., "Runtime Neural Pruning", In Advances in Neural Information Processing Systems, Dec. 4, 2017, 11 Pages.

Liu, et al., "Cambricon: An Instruction Set Architecture for Neural Networks", In Proceedings of the 43rd International Symposium on Computer Architecture, Jun. 18, 2016, pp. 393-405.

Liu, et al., "Efficient Sparse-Winograd Convolutional Neural Networks", In Journal of Computing Research Repository, Feb. 18, 2018, 10 Pages.

Liu, et al., "Sparse Convolutional Neural Networks", In Proceedings of IEEE Conference on Computer Vision and Pattern Recognition, Jun. 7, 2015, pp. 806-814.

Mao, et al., "Exploring the Regularity of Sparse Structure in Convolutional Neural Networks", In Journal of Computing Research Repository, May 24, 2017, 10 Pages.

Marcus, et al., "Treebank-3", In In Linguistic Data Consortium, Jan. 1999, 2 Pages.

Molchanov, et al., "Pruning Convolutional Neural Networks for Resource Efficient Transfer Learning", In Journal of Computing Research Repository, Nov. 19, 2016, 5 Pages.

Narang, et al., "Block-Sparse Recurrent Neural Networks", In Journal of Computing Research Repository, Nov. 8, 2017, 12 Pages.

Neklyudov, et al., "Structured Bayesian Pruning via Log-Normal Multiplicative Noise", In Advances in Neural Information Processing Systems, Dec. 7, 2017, 10 Pages.

Parashar, et al., "SCNN: An Accelerator for Compressed-sparse Convolutional Neural Networks", In Proceedings of the 44th Annual International Symposium on Computer Architecture, Jun. 24, 2017, pp. 27-40.

Posewsky, et al., "Throughput Optimizations for FPGA-based Deep Neural Network Inference", In Journal of Computing Research Repository, Oct. 2018, 24 Pages.

Sak, et al., "Long Short-term Memory Recurrent Neural Network Architectures for Large Scale Acoustic Modeling", In Proceedings of Fifteenth Annual Conference of the International Speech Communication Association, Sep. 14, 2014, 5 Pages.

Salimans, et al., "Weight Normalization: A Simple Reparameterization to Accelerate Training of Deep Neural Networks", In Advances in Neural Information Processing Systems, Dec. 5, 2016, 9 Pages.

(56) References Cited

OTHER PUBLICATIONS

Simonyan, et al., "Very Deep Convolutional Networks for Large-scale Image Recognition", In Proceedings of International Conference on Learning Representations, Apr. 10, 2015, 14 Pages.

Wang, et al., "C-LSTM: Enabling Efficient LSTM using Structured Compression Techniques on FPGAs", In Proceedings of the ACM/SIGDA International Symposium on Field-Programmable Gate Arrays, Feb. 25, 2018, pp. 11-20.

Wang, et al., "Structured Probabilistic Pruning for Convolutional Neural Network Acceleration", In Proceedings of the British Machine Vision Conference, Sep. 10, 2018, 13 Pages.

Wei, et al., "Automated Systolic Array Architecture Synthesis for High Throughput CNN Inference on FPGAs", In Proceedings of the 54th Annual Design Automation Conference, Jun. 18, 2017, 6 Pages.

Wen, et al., "Learning Intrinsic Sparse Structures within Long Short-term Memory", In Proceedings of 6th International Conference on Learning Representations, Sep. 15, 2017, pp. 1-14.

Wen, et al., "Learning Structured Sparsity in Deep Neural Networks", In Proceedings of Advances in Neural Information Processing Systems, Dec. 5, 2016, 9 pages.

Wu, et al., "Google's Neural Machine Translation System: Bridging the Gap Between Human and Machine in Translation", Journal of Computing Research Repository, Sep. 26, 2016, 23 Pages.

Yantir, et al., "Efficient Implementations of Multi-pumped Multi-port Register Files in FPGAs", In Euromicro Conference on Digital System Design, Sep. 4, 2013, 8 Pages.

Yao, et al., "Balanced Sparsity for Efficient DNN Inference on GPU", In Journal of Computing Research Repository, Nov. 1, 2018, 8 pages.

Yu, et al., "Scalpel: Customizing DNN Pruning to the underlying Parallelism", In Proceedings of the 44th Annual International Symposium on Computer Architecture, Jun. 24, 2017, pp. 548-560.

Zaremba, et al., "Recurrent Neural Network Regularization", In Journal of Computing Research Repository, Sep. 8, 2014, 8 Pages.

Zhang, et al., "Cambricon-X: An Accelerator for Sparse Neural Networks", In 49th Annual IEEE/ACM International Symposium on Microarchitecture, Oct. 15, 2016, 12 Pages.

Zhang, et al., "Optimizing FPGA-based Accelerator Design for Deep Convolutional Neural Networks", In Proceedings of the ACM/SIGDA International Symposium on Field-Programmable Gate Arrays, Feb. 22, 2015, pp. 161-170.

Zhou, et al., "FASTCF: FPGA-based Accelerator for STochastic-Gradient-Descent-based Collaborative Filtering", In Proceedings of the ACM/SIGDA International Symposium on Field-Programmable Gate Arrays, Feb. 25, 2018, pp. 259-268.

Zhu, et al., "To Prune, or not to Prune: Exploring the Efficacy of Pruning for Model Compression", In Journal of Computing Research Repository, Oct. 5, 2017, 11 Pages.

* cited by examiner

NEURAL NETWORK COMPRESSION BASED ON BANK-BALANCED SPARSITY

BACKGROUND

An artificial neural network is a computing system composed of artificial neurons for solving artificial intelligence problems, and such system can learn to perform tasks by training on the training data without being programmed with any task-specific rules. Generally, the neural network has a plurality of hyper-parameters such as the number of hidden neurons, layers, and iterations, and a plurality of parameters such as the weights and biases. Initially, weights and biases of an artificial neural network need to be initialized to small random numbers. Then, the neural work is trained using the training data to modify the weights and biases to make it as close as possible to the real model such that the prediction effect of the whole neural network is optimal.

With the development of deep neural networks, the neural networks may have more and more network layers and parameters, which may make the neural network model too big. Model compression has been introduced to reduce the required hardware resources while maintaining the model accuracy, and the model compression is a promising technique that can compress the size of neural networks model by exploring and removing redundant neurons. Weight pruning is a model compression technique to reduce overall memory and computational costs. The pruning forces some weight values in the neural network to zero, and it will reduce the number of non-zero parameters in the model with little loss in the final model quality.

SUMMARY

In embodiments of the present disclosure, there is provided an approach for neural network model compression based on bank-balanced sparsity (BBS). In embodiments of the present disclosure, a set of weight parameters, such as a weight matrix, in a neural network is divided into a plurality of equal-sized banks in terms of number of elements, and then all of the equal-sized banks are pruned at the same sparsity level. In this way, each pruned bank will have the same number of non-zero elements, which is suitable for hardware speedup. Moreover, since each bank is pruned independently in a fine granularity, the model accuracy can be ensured. Thus, according to embodiments of the present disclosure, the neural network compression method based on bank-balanced sparsity can achieve both high model accuracy and high hardware speedup.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to drawings. In the drawings, the same or like reference signs represent the same or like elements, wherein.

DETAILED DESCRIPTION

Figure 1:
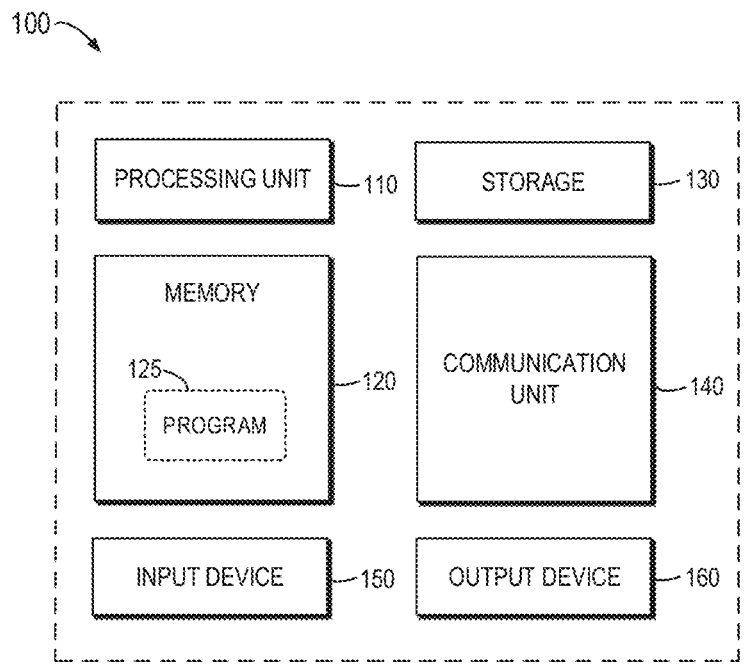
FIG. 1 illustrates a block diagram of a computing device/ server in which one or more embodiments of the present disclosure may be implemented.

Embodiments of the present disclosure will be described in more detail below with reference to figures. Although the drawings show some embodiments of the present disclosure, it should be appreciated that the present disclosure may be implemented in many forms and the present disclosure should not be understood as being limited to embodiments illustrated herein. On the contrary, these embodiments are provided herein to enable more thorough and complete understanding of the present disclosure. It should be appreciated that drawing and embodiments of the present disclosure are only used for exemplary purposes and not used to limit the protection scope of the present disclosure.

As used herein, the term "includes" and its variants are to be read as open terms that mean "includes, but is not limited to." The term "based on" is to be read as "based at least in part on." The term "an embodiment" is to be read as "at least one embodiment." The term "another embodiment" is to be read as "at least one other embodiment." The term "some embodiments" is to be read as "at least some embodiments." Definitions of other terms will be given in the text below.

Traditionally, there are two main neural network model compression methods: fine-grained neural network pruning and coarse-grained neural network pruning. The fine-grained neural network pruning method ranks all the weights in a weight matrix and prunes a predetermined ratio of weights, leading to an unstructured sparse matrix. This unstructured sparsity method introduces irregular computation and memory access, causing a low processing speed. The coarse-grained neural network pruning method sets a block of values (such as 2×2) as a pruning unit, and it prunes or regularizes consecutive weights for efficient computation. However, the block sparsity method often sacrifices the model accuracy of the trained neural network model, which is not acceptable, although it is suitable for hardware acceleration. Therefore, traditional neural network model compression methods cannot achieve both high model accuracy and high hardware speedup.

To this end, a new approach for a BBS-based neural network model compression method is proposed. The bank-balanced sparsity method provides a new sparsity pattern that can maintain model accuracy at a high sparsity level while still enabling an efficient hardware implementation. The bank-balanced sparsity may partition each weight matrix into multiple banks for parallel computing, and it adopts fine-grained pruning inside each bank to maintain model accuracy.

In embodiments of the present disclosure, a set of weight parameters, such as a weight matrix, in a neural network is divided into a plurality of equal-sized banks in terms of number of elements, and then all of the equal-sized banks are pruned at the same sparsity level. In this way, each pruned bank will have the same number of non-zero elements, which is suitable for hardware speedup. In addition, each bank is pruned independently in a fine granularity based on the values of elements, which can maintain the model accuracy. Accordingly, according to embodiments of the present disclosure, the BBS-based neural network model compression method can achieve both high model accuracy and high hardware speedup. Other advantages of embodiments of the present disclosure will be described with reference to the example implementation as below. Reference is made below to FIG. 1 through FIG. 9 to illustrate basic principles and several example embodiments of the present disclosure herein.

FIG. 1 illustrates a block diagram of a computing device/server 100 in which one or more embodiments of the present disclosure may be implemented. It would be appreciated that the computing device/server 100 described in FIG. 1 is merely for illustration but not limit the function and scope of embodiments of the present disclosure in any manners. The computing device/server 100 may be a computer or a server.

As shown in FIG. 1, the computing device server 100 is in the form of a general-purpose computing device. Components of the computing device/server 100 may include, but are not limited to, one or more processor(s) or processing unit(s) 110, a memory 120, a storage device 130, one or more communication unit(s) 140, one or more input device(s) 150, and one or more output device(s) 160. The processing unit 110 may be a physical or virtual processor and perform various processes based on programs stored in the memory 120. In a multiprocessor system, a plurality of processing units may execute computer executable instructions in parallel to improve parallel processing capability of the computing device/server 100.

The computing device/server 100 typically includes various computer storage media. The computer storage media may be any media accessible by the computing device/server 100, including but not limited to volatile and non-volatile media, or removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof.

As shown in FIG. 1, the memory 120 may include a program 125 for implementing the BBS-based neural network model compression according to embodiments of the present disclosure, which may have one or more sets of program modules configured to execute methods and functions of various embodiments described herein. The storage device 130 can be any removable or non-removable media and may include machine-readable media such as a flash drive, disk, and any other media, which can be used for storing information and/or data and accessed within the computing device/server 100. For example, the storage device 130 may be a hard disc drive (HDD) or a solid state drive (SSD).

The computing device/server 100 may further include additional removable/non-removable or volatile/non-volatile storage media. Although not shown in FIG. 1, a magnetic disk drive is provided for reading and writing from/to a removable and non-volatile disk (e.g., "a floppy disk") and an optical disk drive may be provided for reading or writing from/to a removable non-volatile optical disk. In such cases, each drive is connected to the bus (not shown) via one or more data media interfaces.

The communication unit 140 communicates with another computing device via communication media. Additionally, functions of components in the computing device/server 100 may be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 can include one or more input devices such as a mouse, keyboard, tracking ball and the like. The output device 160 can include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown). Next, reference is made below to FIGS. 2-9 to specify example embodiments of the present disclosure.

Figure 2:
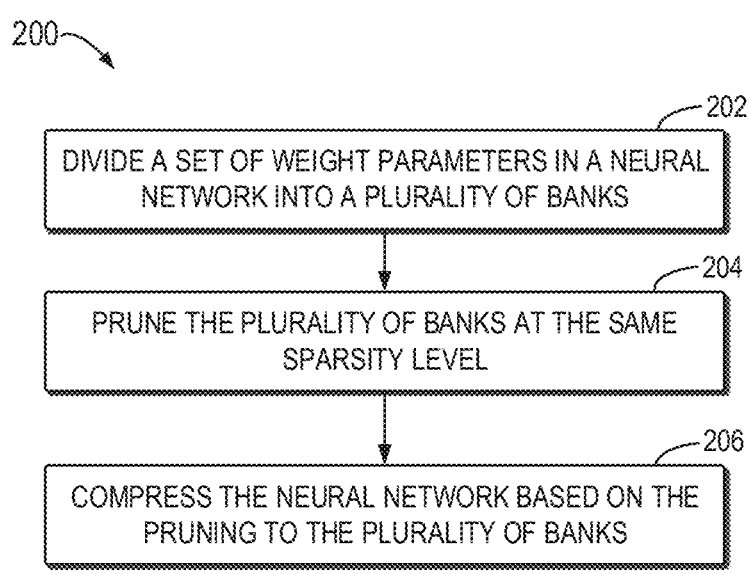
FIG. 2 illustrates a flow chart of a method for BBS-based neural network model compression according to embodiments of the present disclosure.

FIG. 2 illustrates a flow chart of a method for BBS-based neural network model compression according to embodiments of the present disclosure. It should be appreciated that the method 200 may be executed by the computing device/server 100 as described with reference to FIG. 1.

At 202, a set of weight parameters in a neural network is divided into a plurality of banks that have the same number of elements. For example, the set of weight parameters may include a weigh matrix having m rows and n columns, which may be called as an m×n matrix or m-by-n matrix, while m and n are called its dimensions. Generally, a neural network may have a plurality of weight matrices which represent the strength of the connection between units or neurons. The original weigh matrix, which has not been pruned, may be called as a dense weigh matrix. In some embodiments, the set of weight parameters may include a weigh tensor(s).

In some embodiments, each row of the weight matrix may be divided into a predetermined number of equal-sized banks in terms of number of elements, depending on the expected or predetermined sparsity level or ratio. For example, for one row in the weight matrix, every p elements may be regarded as one bank, and the weight matrix may have m×n/p banks after the dividing. In this way, the weight matrix may be split into multiple processing units that have the same number of elements. Alternatively, each column of the weight matrix may be divided into a predetermined number of equal-sized banks, depending on the expected or predetermined sparsity level or ratio. For example, for one column in the weight matrix, every p elements may be regarded as one bank, and the weight matrix may have m/p·n banks after the dividing.

In some embodiments, the dividing unit may be one or more rows. For example, every q row(s) may be regarded as one bank, and the weight matrix may have m/q banks after the dividing. When the specific processing resource is CPU rather than Graphic Processing Unit (GPU) or Field-Programmable Gate Array (FPGA), the bigger granularity banks are more suitable due to the limited processing cores of CPU.

In some embodiments, the neural network may be a neural network based on Long Short-Term Memory (LSTM) which is widely deployed in latency-sensitive language and speech applications. Alternatively, other types of neural networks may be also used in combination with the present disclosure.

At 204, the plurality of banks in the set of weight parameters are pruned at the same sparsity level. For example, the same number of elements will be pruned from each bank according to the absolute values of elements such that the number of remaining non-zero elements in each bank is identical. Assume each bank has p elements, after the pruning, r elements will be reserved in each bank, while other p-r elements are pruned such as being set to blank or zero.

At 206, the neural network is compressed based on the pruning to the plurality of banks. After all the banks in the weight matrix have been pruned, all of the pruned banks will form the pruned weight matrix, which has more non-zero elements than the original dense weight matrix. In this way, the neural network model can be compressed.

According to method 200 of the present disclosure, each pruned bank will have the same number of non-zero elements, which is suitable for hardware speedup. In addition, each bank is pruned independently in a fine granularity based on the values of elements, which can preserve large weights inside each bank and maintain the model accuracy. Thus, according to embodiments of the present disclosure, the neural network model compression method based on bank-balanced sparsity can achieve both high model accuracy and high hardware speedup.

It should be understood that, the method 200 according to embodiments of the present disclosure may be used for all matrix-based deep learning algorithms, including but not limited to, Convolutional Neural Network (CNN), Recurrent Neural Network (RNN). In addition, the method 200 according to embodiments of the present disclosure may be implemented on various specific processing resources, including but not limited to, Field-Programmable Gate Array (FPGA), Graphic Processing Unit (GPU) and so on.

In some embodiments, an example bank-balanced pruning algorithm (such as Algorithm 1) may be used to prune a given weight matrix in the neural network as below. In each pruning iteration, Algorithm sorts the weights in each bank by their absolute magnitudes and zeros out a fraction of weights with smallest absolute magnitudes under the threshold percentage. This threshold percentage is gradually increased from 0 to the target sparsity while the increase rate decreases with pruning iteration.

---

Algorithm 1: Example bank-balanced pruning algorithm

---

Input:
    The weight matrix to be pruned, M;
    The number of banks per row, BankNum;
    The expected sparsity, Sparsity;
Output:
    The pruned matrix, $M_p$;
    for each $M_i \in$ M.rows do
        Divide the row $M_i$ into BankNum banks;
        for each bank $\in M_i$ do
            Sort the elements in bank;
            Calculate the bank internal threshold T in line with Sparsity;
            for each element $\in$ bank do
                prune element if element < T ;
            end for
        end for
    end for
    return the pruned matrix, $M_p$;

---

As seen above in Algorithm 1, each row of the weight matrix may be divided into BankNum banks, and for each bank, all the elements in each bank are ranked first by their absolute values. Then, a respective bank internal threshold T for each bank is calculated based on the expected sparsity ratio, Sparsity, and one or more elements in each bank are pruned based on the respective threshold T. It should be understood, since each bank calculates its internal threshold based on its own values, different banks may have different internal thresholds, which can ensure the model accuracy due to the independent fine-grained pruning. During the pruning, if the model accuracy drops significantly and cannot be recovered via fine-tuning, the pruning iteration and procedure may be withdrawn and stopped.

Figure 3:
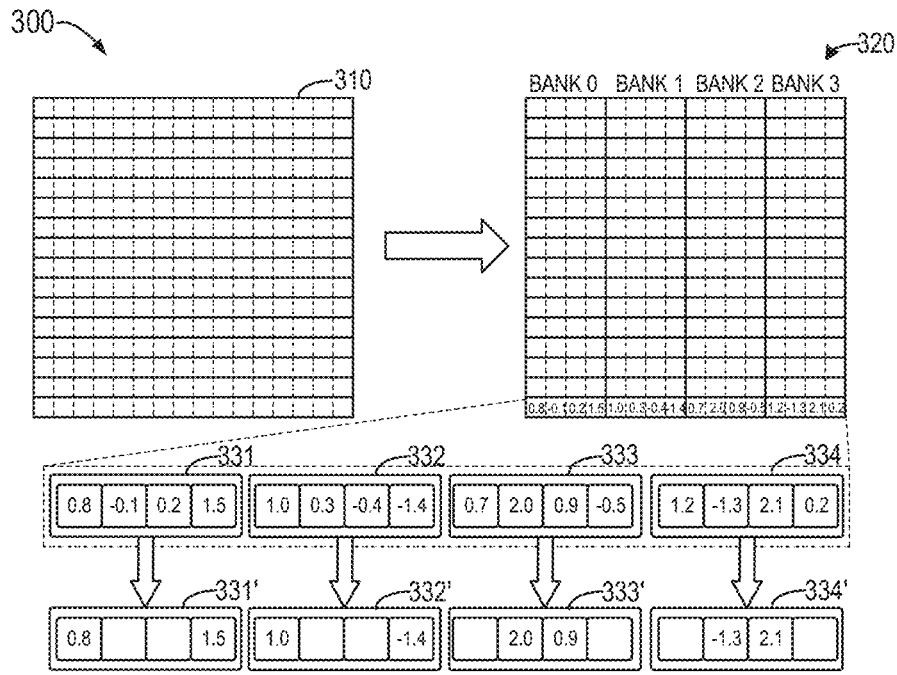
FIG. 3 illustrates a schematic diagram of bank-balanced sparsity for a weight matrix according to embodiments of the present disclosure.

FIG. 3 illustrates a schematic diagram 300 of bank-balanced sparsity for a weight matrix according to embodiments of the present disclosure. As shown in FIG. 3, there is an example dense weight matrix 310 in the neural network, and the example dense weight matrix 310 have 16 rows and 16 columns, that is totally 16×16 elements (such as values). The bank-balanced pruning method according to the present disclosure may be used to prune the example dense weight matrix 310 while maintaining both high model accuracy and high hardware speedup. In some embodiments of the present disclosure, each row in the weight matrix may be split into multiple equal-sized banks (i.e., sub-rows). For example, as shown by arrow 320, each row in the example dense weight matrix 310 is divided into four banks, including bank 0, bank 1, bank 2 and bank 3, and each bank may have four elements. As shown in the last row of the weight matrix 310, values of elements in different banks may be different.

Next, for each divided bank in the weight matrix 310, fine-grained pruning is performed inside each bank independently. As shown in FIG. 3, bank 331 has four elements, such as 0.8, −0.1, 0.2, 1.5. Assume the predetermined sparsity ratio is 50%, the smaller two elements in absolute value, −0.1 and 0.2, will be pruned to form the pruned bank 331'. In some embodiments, for the bank 331, a corresponding threshold (for example 0.8) may be determined based on the predetermined sparsity ratio 50%, and the elements whose absolute values are smaller than the corresponding threshold will be pruned. Generally, an element with a small absolute value may be regarded as small effect to the whole bank. Likewise, the bank 332 is pruned based on the predetermined sparsity ratio 50% so as to form the pruned bank 332', the bank 333 is pruned based on the predetermined sparsity ratio 50% so as to form the pruned bank 333', and the bank 334 is pruned based on the predetermined sparsity ratio 50% so as to form the pruned bank 334'. Instead of using a predetermined or unified threshold across the whole weight matrix, embodiments of the present disclosure use a threshold percentage to obtain identical sparsity ratio among all banks in the weight matrix.

Figure 4:
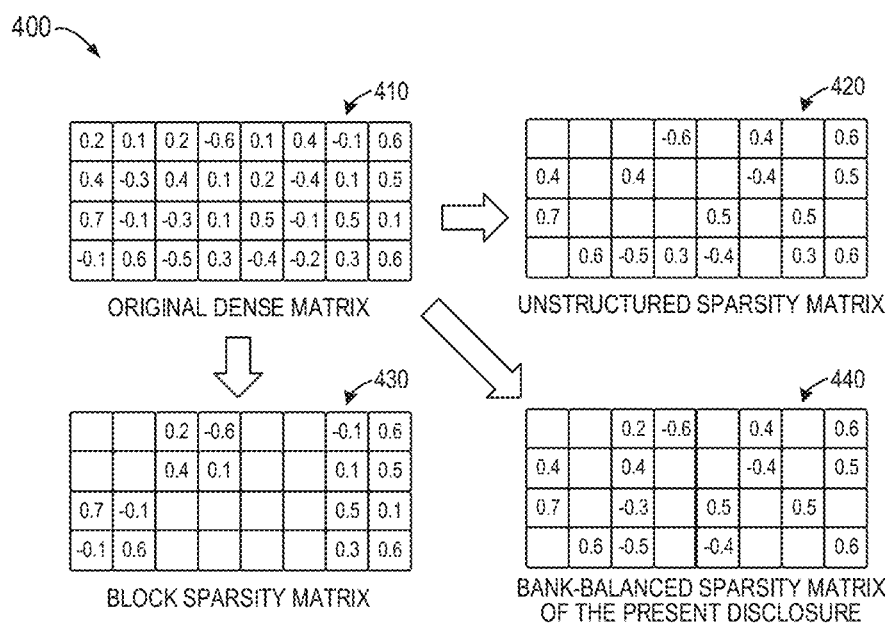
FIG. 4 is a diagram illustrating a comparison of pruning a dense matrix at the same sparsity level between traditional methods and the bank-balanced sparsity method according to embodiments of the present disclosure.

FIG. 4 is a diagram 400 illustrating a comparison of pruning a dense matrix at the same sparsity level between traditional methods and the bank-balanced sparsity method according to embodiments of the present disclosure. As shown in FIG. 4, weight matrix 410 is the original dense matrix to be pruned, weight matrix 420 is an unstructured sparse matrix obtained by traditional fine-grained pruning to the original dense matrix 410; weight matrix 430 is a block sparse matrix obtained by traditional coarse-grained pruning to the original dense matrix 410, where the block size is 2×2; weight matrix 440 is a bank-balanced sparse matrix obtained by bank-balanced pruning to the original dense matrix 410 according to embodiments of the present disclosure.

As shown in FIG. 4, according to traditional fine-grained pruning method, although the obtained unstructured sparse matrix 420 achieves a high accuracy by the global pruning, the unstructured sparse matrix 420 is unstructured and scattered, which introduces irregular computation and memory access and causes a low processing speed. According to traditional coarse-grained priming method, the obtained block sparse matrix 430 is indeed a regular structure for hardware acceleration; however, the traditional coarse-grained pruning method sacrifices the model accuracy of the trained neural network model. For example, as shown in FIG. 4, in block sparse matrix 430, some large weight values 0.5 and 0.4 are pruned, while some small weigh values 0.1 and −0.1 are preserved.

By contrast, according to bank-balanced pruning method of the present disclosure, the obtained bank-balanced sparse matrix 440 considers both hardware efficiency and model accuracy. On one hand, the bank-balanced pruning enables an efficient design to exploit both inter-row parallelism and inter-bank parallelism, which is suitable for hardware acceleration. On the other hand, since the bank-balanced pruning applies fine-grained pruning within each bank independently, the relatively large weights which contribute more to the neural network model in each bank can be preserved, thereby ensuring the model accuracy.

Figure 5:
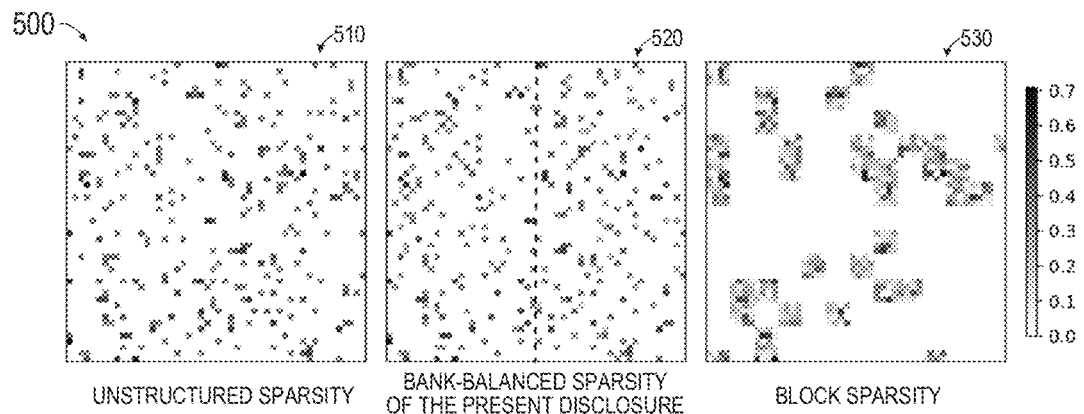
FIG. 5 illustrates a weight map visualization after pruning a dense matrix at the same sparsity level with traditional methods and the bank-balanced sparsity method according to embodiments of the present disclosure.

FIG. 5 illustrates weight map visualization 500 after pruning a dense weight matrix at the same sparsity level with traditional methods and the bank-balanced sparsity method according to embodiments of the present disclosure. FIG. 5 shows a weight map 510 after matrix pruning according to the traditional unstructured sparsity method, a weight map 520 after matrix pruning according to bank-balanced sparsity method of the present disclosure, and a weight map 530 after matrix pruning according to the traditional block sparsity method, wherein the grey grids indicate non-zero parameters and the grey level indicates the weight magnitude. It should be understood that the weight map visualization 500 merely represents a small part of the whole weight matrix in a real neural network model.

As shown by the weight map 520, each row is divided into two banks, as separated by the dashed line, and each pruned bank has 3 non-zero elements. From the experiment results in FIG. 5, the weight map 520 is very similar to the weight map 510, which means the bank-balanced pruning method according to the present disclosure can have a similar accuracy as the traditional fine-grained pruning method. Instead, the weight map 530 according to traditional coarse-grained pruning method is quite different from the weight map 510, which means the traditional coarse-grained pruning method may sacrifice the model accuracy. In addition, as shown by the weight map 520 according to the bank-balanced pruning method of the present disclosure, since each bank has the same number of non-zero elements, the model acceleration may be also achieved.

Figure 6:
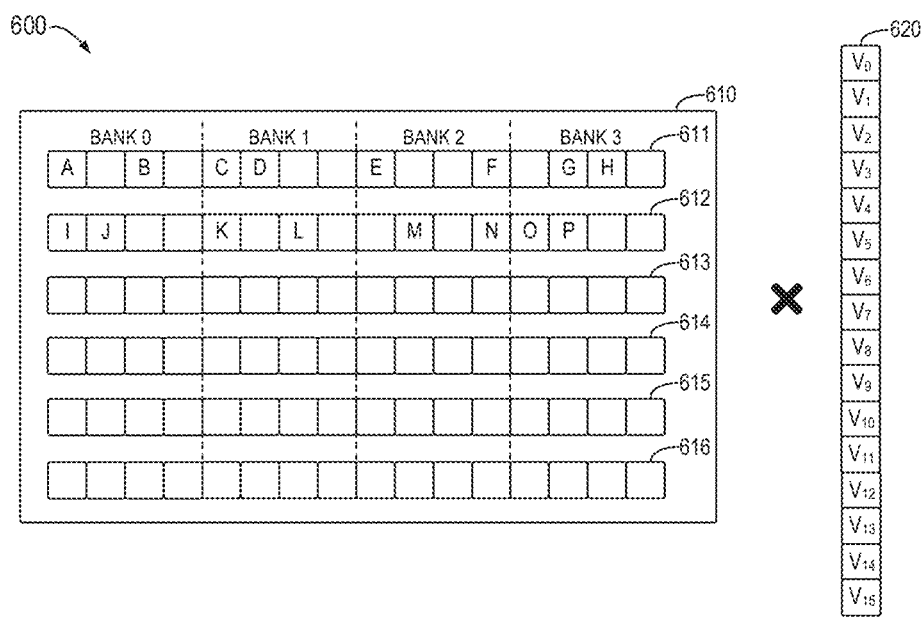
FIG. 6 is a diagram illustrating an example product computation of a weight matrix and a dense vector according to embodiments of the present disclosure.

FIG. 6 is a diagram 600 illustrating an example product computation of a weight matrix and a dense vector according to embodiments of the present disclosure. As shown in FIG. 6, a pruned weight matrix 610 is to be multiplied with a given dense vector 620, and the weight matrix 610 comprises a plurality of rows, such as rows 611, 612, 613, 614, 615 and 616. According to embodiments of the present disclosure, each row may be divided into four banks, and each bank may be pruned at the same sparsity level. For example, the pruned bank 0 in row 611 has two non-zero elements A and B, the pruned bank 1 in row 611 has two non-zero elements C and D, the pruned bank 2 in row 611 has two non-zero elements E and F, and the pruned bank 3 in row 611 has two non-zero elements G and H. During the multiplication, multiple processing elements may be used to perform the multiplication in parallel, for example, a first processing element may be used to multiply row 611 and pruning vector 620, while a second processing element may be used to multiply row 612 and pruning vector 620. In this way, multiple processing elements may be used to parallelize dot products across matrix rows, and thus inter-row parallelism of matrix multiplication can be achieved.

Figure 7:
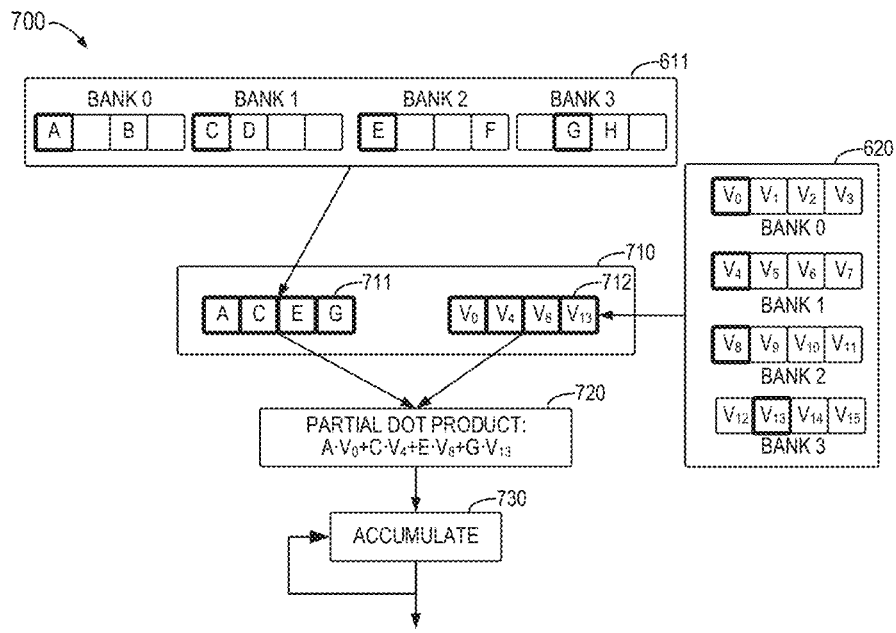
FIG. 7 illustrates a process of exploiting inter-bank parallelism in dot product computation of a weight matrix and a dense vector according to embodiments of the present disclosure.

According to embodiments of the present disclosure, in addition to inter-row parallelism, intra-row parallelism (for example inter-bank parallelism) may be also achieved through the bank-balanced partitioning. FIG. 7 illustrates a process 700 of exploiting inter-bank parallelism in dot product computation of a weight matrix and a dense vector according to embodiments of the present disclosure. FIG. 7 illustrates how to exploit inter-bank parallelism in computing a dot product of two vectors, such as a bank-balanced matrix row 611 and the dense vector 620. The multiplication for the non-zero elements inside each bank is performed serially, while the multiplications in different banks may be performed in parallel.

As shown in FIG. 7, the sparse matrix row 611 is divided into 4 banks, and the size of each bank is 4 while the sparsity is 50%. The multiplied dense vector 620 is divided into 4 banks accordingly. Embodiments of the present disclosure compute the dot product of two vectors by accumulating dot products of sub-vectors whose sizes are all the number of banks in a row. At 710, each bank of the sparse matrix row 611 provides one non-zero element ranked first to form one sub-vector 711, such as (A, C, E, G), while corresponding elements in the dense vector 620 are fetched based on the indices of non-zero values (A, C, E, G) in the respective pruned banks to form another sub-vector 712, such as ($V_0$, $V_4$, $V_8$, $V_{13}$). Next, at 720, partial dot product of sub-vector 711 and sub-vector 712 is calculated. For computing a dot product of sub-vectors, four pair-wise multiplications are executed in parallel as shown by 720. Multiple dot products of sub-vectors are calculated in sequential and accumulated at 730 to obtain the dot product of whole vectors.

Accordingly, the bank-balanced property according to embodiments of the present disclosure eliminates load imbalance and irregular memory accesses. In the bank-balanced sparsity matrices, every row and every bank have the same number of non-zero elements, which automatically guarantees the load balance across both rows and banks in the sparse matrix multiplication. When calculating a partial dot product, the bank-balanced sparsity ensures one and only one element is accessed in each bank. Therefore, storing each vector bank in an independently accessible block can supply vector elements simultaneously with high bandwidth and without memory access conflicts.

Figure 8A:
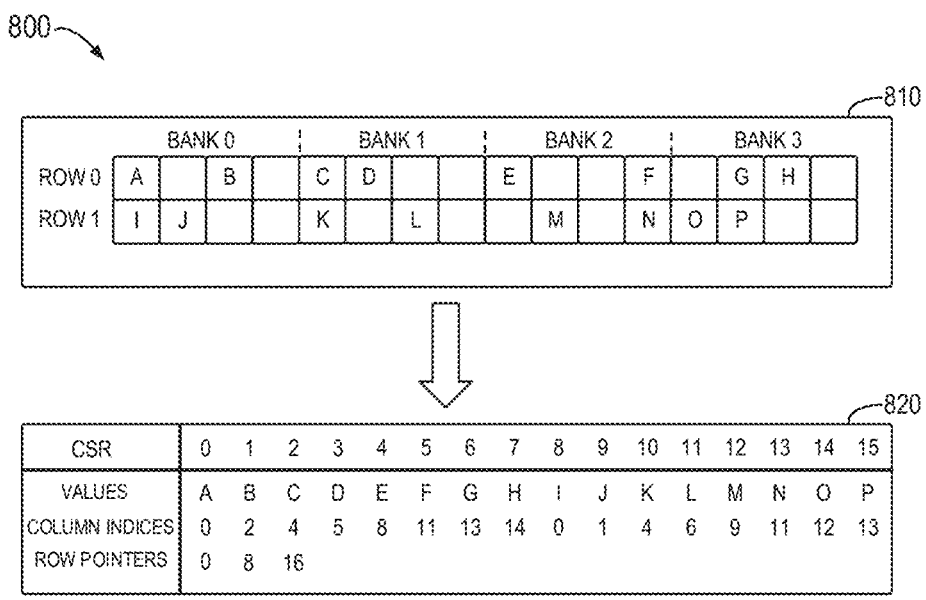
FIG. 8A illustrates a traditional process of converting an original densely represented matrix to a compressed sparse row (CSR) represented matrix.

FIG. 8A illustrates a traditional process 800 of converting an original densely represented matrix to a compressed sparse row (CSR) represented matrix. CSR is a commonly used sparse matrix format, and it may be used as a representative encoding of existing formats for explanation and comparison. As shown in FIG. 8A, for a bank-balanced sparse matrix 810 represented in dense format, it may be encoded to the CSR represented matrix 820. Generally, CSR may incur two types of overheads for sparse matrix multiplication operation. First, CSR format encodes all non-zero elements in a row-major order. Thus, rearranging the non-zero elements is inevitable in order to exploit inter-bank parallelism in the sparse matrix multiplication. Second, CSR format stores column indices and row pointers to track the location of each non-zero element. Thus, calculating memory addresses is required to fetch vector elements.

Figure 8B:
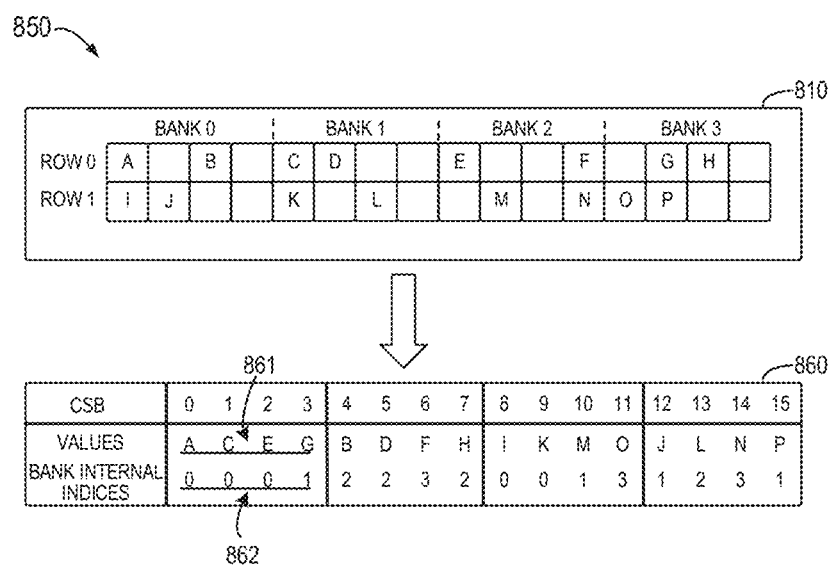
FIG. 8B illustrates an example process of converting an original densely represented matrix to a compressed sparse banks (CSB) represented matrix according to embodiments of the present disclosure.

FIG. 8B illustrates an example process 850 of converting an original densely represented matrix to a compressed sparse banks (CSB) represented matrix according to embodiments of the present disclosure. The proposed CSB format takes advantage of the bank-balanced property and eliminates the need for decoding. As shown in FIG. 8B, the bank-balanced sparse matrix 810 represented in dense format is encoded to CSB represented matrix 860.

The CSB encoding uses two arrays to represent a bank-balanced sparse matrix. In the first array 861 (i.e., values), all non-zero values are first arranged in row-major order. For example, for the row 0 in sparse matrix 810, (A, B, C, D, E, F, G, H) are first arranged in row-major order, followed by the non-zero elements in row 1 in sparse matrix 810, (I, J, K, L, M, N, O, P). Then, data rearrangement is performed inside each row, the first non-zero values (e.g., (A, C, E, G)) in all banks in row 0 are listed first, then the second non-zero values (e.g., (B, D, F, H)) in all banks in row 0 follow. The purpose of this data rearrangement is to explicitly expose inter-bank parallelism, thus every successive N elements in CSB can be directly fetched and computed in parallel. The second array 862 (i.e., indices) lists the bank internal indices of non-zero values, which are column indices modulo bank size. In some embodiments, when each of the N vector banks is stored in a separate BRAM block on FPGA, the bank internal indices can be directly regarded as physical addresses to fetch the N corresponding vector elements in the BRAM blocks, thereby reducing the decoding overheads.

Figure 9:
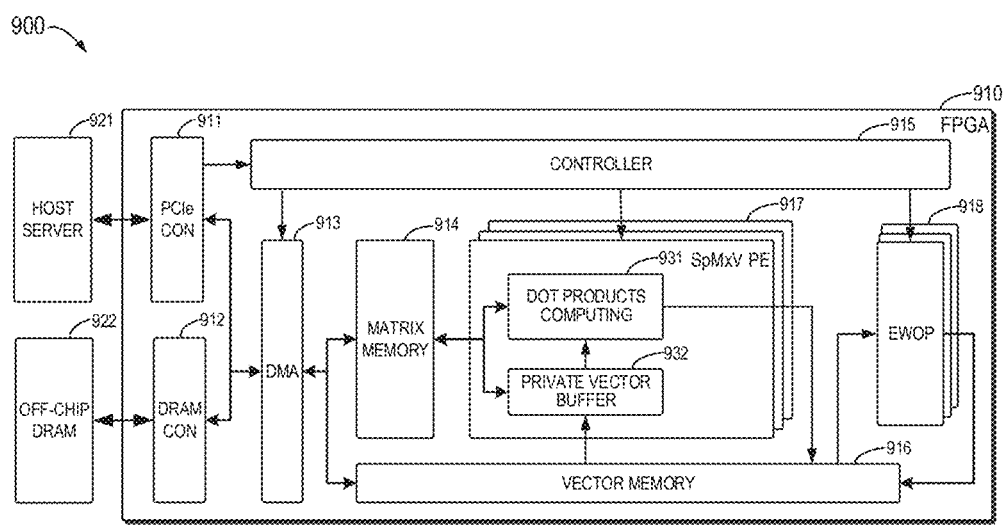
FIG. 9 illustrates an example hardware architecture for FPGA accelerator according to embodiments of the present disclosure.

FIG. 9 illustrates an example hardware architecture 900 for the FPGA accelerator according to embodiments of the present disclosure. As shown in FIG. 9, the architecture 900 comprises FPGA accelerator 910, a host server 921 and an off-chip DRAM 922, and the FPGA accelerator 910 comprises a PCIe controller 911, a DRAM controller 912, a direct memory access (DMA) module 913, a matrix memory 914 for storing matrices, a controller 915, a vector memory 916 for storing vectors, a SpMxV unit 917 including a plurality of SpMxV PEs, and an element-wise vector operation (EWOP) unit 918. The matrix memory 914 may store the CSB represented matrix 860 as shown in FIG. 8B. It should be understood that although FPGA-based architecture 900 is described as a hardware implementation for the bank-balanced sparsity of the present disclosure, other hardware implementations (such as GPU and so on) may be also used in combination with the present disclosure.

Before hardware acceleration, the host server 921 uses the bank-balanced pruning method according to embodiments of the present disclosure to prune weight matrices and represents sparse matrices in the CSB format, as discussed above in FIG. 8B, then a lightweight compiler generates instructions for the hardware accelerator to accomplish the computation of neural network. The controller 915 receives and stores instructions from the host server 921 in its instruction buffer (not shown) via the PCIe controller 911 and dispatches the instructions to the corresponding modules to execute. In the example FPGA architecture 90, the main two types of instructions are load/store instructions and computational instructions.

Load/store instructions are executed in the DMA module 913 to transfer weight matrices and input/output vectors. A load instruction executing in the DMA module 913 may read data (such as weights and inputs) from host server 921 via the PCIe controller 911 and/or off-chip DRAM 922 via DRAM controller 912 to on-chip memories, such as matrix memory 914 and vector memory 916. A store instruction may write data (such as outputs) from on-chip memories to host server 921 and/or off-chip DRAM 922. In many cases, weight pruning can reduce model size enough to fit into on-chip memories. Accordingly, for serving real-time neural network with low latency, the default mode is to completely rely on on-chip memories. For large models that cannot completely fit into on-chip memories even with compression, the FPGA accelerator uses load/store instructions to read/write weight matrices from/to off-chip DRAM 922.

Computational instructions are used for sparse matrix multiplications, the operations in sparse neural network may be put into 2 categories: sparse matrix multiplications (SpMxV) and EWOP (including addition, multiplication and three kinds of activations). Therefore, two kinds of computational instructions (SpMxV instruction and EWOP instruction) are designed to fulfill neural network computation. The SpMxV instruction is executed in the SpMxV unit 917 to read the required matrix and vector from on-chip memories (such as matrix memory 914 and vector memory 916), then compute dot products for matrix rows, and finally write the result vector back to the vector memory 916. Each SpMxV unit 917 comprises a dot products computing unit 931 and a private vector buffer 932, the dot products computing unit 931 receives values from the matrix memory 914 while the private vector buffer 932 receives indices from matrix memory 914. The EWOP instruction is executed in the EWOP unit 918 to read required vector(s) from the vector memory 916 and write the resulting vector of element-wise addition/multiplication/activations back to the vector memory 916.

The SpMxV unit 917 implements the highly parallel design for the FPGA accelerator 910. The SpMxV unit 917 consists of M parallel processing elements (PEs) that compute dot products of distinct matrix rows and the dense vector concurrently to exploit inter-row parallelism, while each PE may be designed to exploit intra-row (i.e., inter-bank) parallelism in a single dot product operation.

As shown in FIG. 9, each SpMxV PE contains a private vector buffer (PVB) 932 to buffer the dense vector being multiplied, because vector elements are randomly accessed multiple times for all matrix rows during the multiplication. The SpMxV PE computes the dot product of two vectors by accumulating dot products of sub-vectors. This computation may include 5 steps: (1) The SpMxV PE reads N matrix row elements from the matrix memory 914 and N vector elements based on the sparse indices from the private vector buffer 932; (2) N multipliers operate simultaneously to obtain N scalar products; (3) an N-input adder tree sums N scalar products to calculate the partial dot product; (4) one accumulator is used to obtain the complete dot product; (5) the dot product result is written back to global vector memory 916. The SpMxV PE is fully pipelined so that one operation can be processed per clock cycle. With M PEs and N multipliers per PE, this PE array achieves M×N parallelism for a single SpMxV operation. In this way, the processing speed for matrix multiplication can be further increased.

The private vector buffer 932 is used to buffer the dense vector being multiplied. According to embodiments of the present disclosure, in each SpMxV PE of the SpMxV unit 917, N weight elements can be simultaneously accessed in one clock cycle because non-zero values have already been rearranged by CSB encoding format and contiguously stored in matrix memory 914. However, to access dense vector elements, the private vector buffer 932 needs to support N random memory accesses concurrently. Each BRAM in FPGA provides only two read and/or write ports. Using a single BRAM to buffer dense vectors cannot supply N elements from random addresses concurrently. Multi-pumping and vector replication are two alternative solutions. Multi-pumping supplies N elements by running the PEs with N times lower frequency than the BRAM. This approach decreases clock rate significantly. Vector replication provides more ports by creating replicas of the entire vector. Although this approach is simple to implement, it is difficult to scale due to limited on-chip storage resources in FPGA and generally large input/output/state vectors in neural network.

In order to support random vector accesses at a high bandwidth without replicas inside a PE, in some embodiments, the banking approach is adopted to buffer vectors. In this approach, the multiplied vector is also split into banks according to the bank partitioning of matrix rows of the present disclosure. In some embodiments, N banks of vector elements are stored in N independently accessible BRAMs. Therefore, the private vector buffer 932 can provide N elements simultaneously with N bank internal indices (i.e., physical addresses for each BRAM). Generally, weight matrices in a neural network may have the same size, so embodiments of the present disclosure use a unified N in pruning and configure N as the number of BRAMs in private vector buffer. However, for some neural networks that have weight matrices of different sizes, different values of N may be selected in pruning to find an optimal sparsity, and the largest N is configured as the number of BRAMs in private vector buffer.

In some embodiments, banking to the dense vector may be adopted to support random memory accesses to achieve high memory bandwidth. However, due to the irregularity of data accesses, banked memory cannot handle imbalance workloads across banks and concurrent access requests to the same BRAM. Addressing these issues requires additional logic and clock cycles. The biggest difference of the banked private vector buffer 932 of embodiments of the present disclosure is that balanced memory access requests and no memory access conflicts are automatically guaranteed because of the intrinsic bank-balanced property of the present disclosure. Generally, the SpMxV PE accesses one and only one element in each BRAM per cycle.

Before a SpMxV operation, the vector to be multiplied requires to be duplicated in each PE's private vector memory 932 to exploit inter-row parallelism. This brings two issues. First, broadcasting vector elements to various PEs leads to high fan-out and thus results in a low achievable clock frequency. Accordingly, embodiments of the present disclosure use a systolic array structure to achieve high clock frequency. The second issue is the additional access latency. Accordingly, embodiments of the present disclosure double-buffer the private vector buffer for pipelined data transfer and computation.

The EWOP unit 918 performs various element-wise operations on vectors based on the instruction opcode. Vector addition and multiplication generate one result vector by reading two source vectors. Activation functions only read one source vector and apply nonlinear functions to it to generate one result vector. The EWOP unit contains 918 M operators operating in parallel for each kind of operations to reduce latency.

The controller 915 is used to control the operations in the FPGA accelerator 910. In the computation flow of neural network, some SpMxV operations and EWOP operations among different gates can be performed simultaneously. The software compiler analyzes the dependencies and indicates the dependencies to instructions. The controller parallelizes instructions according to their dependent instructions indicated by the software compiler. When the SpMxV unit 917 or the EWOP unit 918 is idle (which means an instruction is finished), the controller 915 may check whether the next instruction has a dependency on the instruction being executed on the other unit. If not, the controller 915 dispatches the next instruction to the idle unit, so that the SpMxV unit 917 and EWOP unit 918 can work simultaneously.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single implementation. Conversely, various features that are described in the context of a single implementation may also be implemented in multiple embodiments separately or in any suitable subcombination.

Some example embodiments of the present disclosure are listed below.

In one aspect, there is provided a computer-implemented method. The method comprises: dividing a set of weight parameters in a neural network into a plurality of banks that have the same number of elements; pruning the plurality of banks in the set of weight parameters at the same sparsity level; and compressing the neural network based on the pruning to the plurality of banks.

In some embodiments, wherein the set of weight parameters comprises a weight matrix, and the dividing a set of weight parameters in a neural network into a plurality of banks comprises: dividing each row in the weight matrix into a predetermined number of equal-sized banks; and obtaining the plurality of banks based on the dividing to each row in the weight matrix.

In some embodiments, wherein the pruning the plurality of banks in the set of weight parameters at the same sparsity level comprises: ranking a first set of elements in a first bank of the plurality of banks: determining a first threshold for the first bank based on the sparsity level; and pruning one or more elements in the first bank based on the first threshold.

In some embodiments, wherein the pruning the plurality of banks in the set of weight parameters at the same sparsity level further comprises: ranking a second set of elements in a second bank of the plurality of banks determining a second threshold for the second bank based on the sparsity level, the second threshold being different from the first threshold; and pruning one or more elements in the second bank based on the second threshold.

In some embodiments, wherein the dividing a set of weight parameters in a neural network into a plurality of banks comprises: dividing one or more of a plurality of rows in a weight matrix into one bank of the plurality of banks.

In some embodiments, wherein the dividing a set of weight parameters in a neural network into a plurality of banks comprises: dividing each column in the weight matrix into a predetermined number of equal-sized banks: and obtaining the plurality of banks based on the dividing to each column in the weight matrix.

In some embodiments, wherein the compressing the neural network based on the pruning to the plurality of banks comprises: determining a first sub-vector based on multiple non-zero elements that are selected from multiple pruned banks in one row in the pruned weight matrix respectively; determining a second sub-vector from a given vector based on indices of the multiple non-zero elements in the multiple pruned banks; and determining a partial dot product of the first sub-vector and the second sub-vector.

In some embodiments, wherein the compressing the neural network based on the pruning to the plurality of banks further comprises: encoding the pruned weight matrix to be two arrays, a first array of the two arrays comprising a plurality of non-zero elements in the pruned plurality of banks, and a second array of the two arrays comprising an internal index of each non-zero element in the respective bank of the pruned plurality of banks.

In some embodiments, wherein the encoding the pruned weight matrix to be two arrays comprises: rearranging an order of the plurality of non-zero elements in the first array such that the multiple non-zero elements from the multiple pruned banks in the one row are stored in succession.

In another aspect, there is provided an electronic device. The electronic device comprises a processing unit and a memory coupled to the processing unit and storing instructions thereon. The instructions, when executed by the processing unit, perform acts comprising: dividing a set of weight parameters in a neural network into a plurality of banks that have the same number of elements; pruning the plurality of banks in the set of weight parameters at the same sparsity level: and compressing the neural network based on the pruning to the plurality of banks.

In some embodiments, wherein the set of weight parameters comprises a weight matrix, and the dividing a set weight parameters in a neural network into a plurality of banks comprises: dividing each row in the weight matrix into a predetermined number of equal-sized banks: and obtaining the plurality of banks based on the dividing to each row in the weight matrix.

In some embodiments, wherein the pruning the plurality of banks in the set of weight parameters at the same sparsity level comprises: ranking a first set of elements in a first bank of the plurality of banks: determining a first threshold for the first bank based on the sparsity level; and pruning one or more elements in the first bank based on the first threshold.

In some embodiments, wherein the pruning the plurality of banks in the set of weight parameters at the same sparsity level further comprises: ranking a second set of elements in a second bank of the plurality of banks: determining a second threshold for the second bank based on the sparsity level, the second threshold being different from the first threshold; and pruning one or more elements in the second bank based on the second threshold.

In some embodiments, wherein the dividing a set of weight parameters in a neural network into a plurality of banks comprises: dividing one or more of a plurality of rows in a weight matrix into one bank of the plurality of banks.

In some embodiments, wherein the dividing a set of weight parameters in a neural network into a plurality of banks comprises: dividing each column in the weight matrix into a predetermined number of equal-sized banks; and obtaining the plurality of banks based on the dividing to each column in the weight matrix.

In some embodiments, wherein the compressing the neural network based on the pruning to the plurality of banks comprises: determining a first sub-vector based on multiple non-zero elements that are selected from multiple pruned banks in one row in the pruned weight matrix respectively: determining a second sub-vector from a given vector based on indices of the multiple non-zero elements in the multiple pruned banks; and determining a partial dot product of the first sub-vector and the second sub-vector.

In some embodiments, wherein the compressing the neural network based on the pruning to the plurality of banks further comprises: encoding the pruned weight matrix to be two arrays, a first array of the two arrays comprising a plurality of non-zero elements in the pruned plurality of banks, and a second array of the two arrays comprising an internal index of each non-zero element in the respective bank of the pruned plurality of banks.

In some embodiments, wherein the encoding the pruned weight matrix to be two arrays comprises rearranging an order of the plurality of non-zero elements in the first array such that the multiple non-zero elements from the multiple pruned banks in the one row are stored in succession.

In a further aspect, there is provided a computer program product. The computer program product comprises executable instructions. The executable instructions, when executed on a device, cause the device to perform acts. The acts comprise: dividing a set of weight parameters in a neural network into a plurality of banks that have the same number of elements; pruning the plurality of banks in the set of weight parameters at the same sparsity level; and compressing the neural network based on the pruning to the plurality of banks.

In some embodiments, wherein the set of weight parameters comprises a weight matrix, and the dividing a set of weight parameters in a neural network into a plurality of banks comprises: dividing each row in the weight matrix into a predetermined number of equal-sized banks: and obtaining the plurality of banks based on the dividing to each row in the weight matrix.

In some embodiments, wherein the pruning the plurality of banks in the set of weight parameters at the same sparsity level comprises: ranking a first set of elements in a first bank of the plurality of banks; determining a first threshold for the first bank based on the sparsity level; and pruning one or more elements in the first bank based on the first threshold.

In some embodiments, wherein the pruning the plurality of banks in the set of weight parameters at the same sparsity level further comprises: ranking a second set of elements in a second bank of the plurality of banks; determining a second threshold for the second bank based on the sparsity level, the second threshold being different from the first threshold; and pruning one or more elements in the second bank based on the second threshold.

In some embodiments, wherein the dividing a set of weight parameters in a neural network into a plurality of banks comprises: dividing one or more of a plurality of rows in a weight matrix into one bank of the plurality of banks.

In some embodiments, wherein the dividing a set of weight parameters in a neural network into a plurality of banks comprises: dividing each column in the weight matrix into a predetermined number of equal-sized banks; and obtaining the plurality of banks based on the dividing to each column in the weight matrix.

In some embodiments, wherein the compressing the neural network based on the pruning to the plurality of banks comprises: determining a first sub-vector based on multiple non-zero elements that are selected from multiple pruned banks in one row in the pruned weight matrix respectively: determining a second sub-vector from a given vector based on indices of the multiple non-zero elements in the multiple pruned banks: and determining a partial dot product of the first sub-vector and the second sub-vector.

In some embodiments, wherein the compressing the neural network based on the pruning to the plurality of banks further comprises: encoding the pruned weight matrix to be two arrays, a first array of the two arrays comprising a plurality of non-zero elements in the pruned plurality of banks, and a second array of the two arrays comprising an internal index of each non-zero element in the respective bank of the pruned plurality of banks.

In some embodiments, wherein the encoding the pruned weight matrix to be two arrays comprises: rearranging an order of the plurality of non-zero elements in the first array such that the multiple non-zero elements from the multiple pruned banks in the one row are stored in succession.

Although the present disclosure has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments.

We claim:

1. A computer-implemented method, comprising:
   dividing a set of weight parameters in a neural network into a plurality of banks, the plurality of banks having the same number of elements;
   pruning the plurality of banks in the set of weight parameters at the same sparsity level to cause each bank of the plurality of banks to prune a same number of elements, wherein each bank of the plurality of banks includes an identical number of elements subsequent to the pruning, wherein pruning a bank of the plurality of banks ranks weight parameters of the bank based on respective absolute values of the weight parameters, wherein weight parameters with lowest absolute values are pruned until the same sparsity level is reached, and wherein the weight parameters with the lowest absolute values have a lower importance to the neural network than weight parameters with higher absolute values; and
   compressing the neural network based on the pruning to the plurality of banks.

2. The method according to claim 1, wherein the set of weight parameters comprises a weight matrix, and the dividing a set of weight parameters in a neural network into a plurality of banks comprises:
   dividing each row in the weight matrix into a predetermined number of equal-sized banks; and
   obtaining the plurality of banks based on the dividing to each row in the weight matrix.

3. The method according to claim 2, wherein the pruning the plurality of banks in the set of weight parameters at the same sparsity level comprises:
   ranking a first set of elements in a first bank of the plurality of banks,
   determining a first threshold for the first bank based on the sparsity level; and
   pruning one or more elements in the first bank based on the first threshold.

4. The method according to claim 3, wherein the pruning the plurality of banks in the set of weight parameters at the same sparsity level further comprises:
   ranking a second set of elements in a second bank of the plurality of banks,
   determining a second threshold for the second bank based on the sparsity level, the second threshold being different from the first threshold; and
   pruning one or more elements in the second bank based on the second threshold.

5. The method according to claim 1, wherein the dividing a set of weight parameters in a neural network into a plurality of banks comprises:
dividing one or more of a plurality of rows in a weight matrix into one bank of the plurality of banks.

6. The method according to claim 1, wherein the dividing a set of weight parameters in a neural network into a plurality of banks comprises:
dividing each column in a weight matrix into a predetermined number of equal-sized banks; and
obtaining the plurality of banks based on the dividing to each column in the weight matrix.

7. The method according to claim 2, wherein the compressing the neural network based on the pruning to the plurality of banks comprises:
determining a first sub-vector based on multiple non-zero elements that are selected from multiple pruned banks in one row in the weight matrix respectively;
determining a second sub-vector from a given vector based on indices of the multiple non-zero elements in the multiple pruned banks; and
determining a partial dot product of the first sub-vector and the second sub-vector.

8. The method according to claim 7, wherein the compressing the neural network based on the pruning to the plurality of banks further comprises:
encoding the pruned weight matrix to be two arrays, a first array of the two arrays comprising a plurality of non-zero elements in the pruned plurality of banks, and a second array of the two arrays comprising an internal index of each non-zero element in the respective bank of the pruned plurality of banks.

9. The method according to claim 8, wherein the encoding the pruned weight matrix to be two arrays comprises:
rearranging an order of the plurality of non-zero elements in the first array such that the multiple non-zero elements from the multiple pruned banks in the one row are stored in succession.

10. An electronic device, comprising:
a processing unit,
a memory coupled to the processing unit and storing instructions thereon, the instructions, when executed by the processing unit, performing acts comprising:
dividing a set of weight parameters in a neural network into a plurality of banks, the plurality of banks having the same number of elements;
pruning the plurality of banks in the set of weight parameters at the same sparsity level to cause each bank of the plurality of banks to prune a same number of elements wherein each bank of the plurality of banks includes an identical number of elements subsequent to the pruning, wherein pruning a bank of the plurality of banks ranks weight parameters of the bank based on respective absolute values of the weight parameters, wherein weight parameters with lowest absolute values are pruned until the same sparsity level is reached, and wherein the weight parameters with the lowest absolute values have a lower importance to the neural network than weight parameters with higher absolute values; and
compressing the neural network based on the pruning to the plurality of banks.

11. The device according to claim 10, wherein the set of weight parameters comprises a weight matrix, and the dividing a set of weight parameters in a neural network into a plurality of banks comprises:
dividing each row in the weight matrix into a predetermined number of equal-sized banks; and
obtaining the plurality of banks based on the dividing to each row in the weight matrix.

12. The device according to claim 11, wherein the pruning the plurality of banks in the set of weight parameters at the same sparsity level comprises:
ranking a first set of elements in a first bank of the plurality of banks;
determining a first threshold for the first bank based on the sparsity level; and
pruning one or more elements in the first bank based on the first threshold.

13. The device according to claim 12, wherein the pruning the plurality of banks in the set of weight parameters at the same sparsity level further comprises:
ranking a second set of elements in a second bank of the plurality of banks,
determining a second threshold for the second bank based on the sparsity level, the second threshold being different from the first threshold; and
pruning one or more elements in the second bank based on the second threshold.

14. The device according to claim 10, wherein the dividing a set of weight parameters in a neural network into a plurality of banks comprises:
dividing one or more of a plurality of rows in a weight matrix into one bank of the plurality of banks.

15. The device according to claim 10, wherein the dividing a set of weight parameters in a neural network into a plurality of banks comprises:
dividing each column in a weight matrix into a predetermined number of equal-sized banks; and
obtaining the plurality of banks based on the dividing to each column in the weight matrix.

16. The device according to claim 11, wherein the compressing the neural network based on the pruning to the plurality of banks comprises:
determining a first sub-vector based on multiple non-zero elements that are selected from multiple pruned banks in one row in the pruned weight matrix respectively;
determining a second sub-vector from a given vector based on indices of the multiple non-zero elements in the multiple pruned banks, and
determining a partial dot product of the first sub-vector and the second sub-vector.

17. The device according to claim 16, wherein the compressing the neural network based on the pruning to the plurality of banks further comprises:
encoding the pruned weight matrix to be two arrays, a first array of the two arrays comprising a plurality of non-zero elements in the pruned plurality of banks, and a second array of the two arrays comprising an internal index of each non-zero element in the respective bank of the pruned plurality of banks.

18. The device according to claim 17, wherein the encoding the pruned weight matrix to be two arrays comprises:
rearranging an order of the plurality of non-zero elements in the first array such that the multiple non-zero elements from the multiple pruned banks in the one row are stored in succession.

19. A non-transitory computer program product comprising executable instructions, the executable instructions, when executed on a device, cause the device to perform acts comprising:

dividing a set of weight parameters in a neural network into a plurality of banks, the plurality of banks having the same number of elements;

pruning the plurality of banks in the set of weight parameters at the same sparsity level to cause each bank of the plurality of banks to prune a same number of elements, wherein each bank of the plurality of banks includes an identical number of elements subsequent to the pruning, wherein pruning a bank of the plurality of banks ranks weight parameters of the bank based on respective absolute values of the weight parameters, wherein weight parameters with lowest absolute values are pruned until the same sparsity level is reached, and wherein the weight parameters with the lowest absolute values have a lower importance to the neural network than weight parameters with higher absolute values; and compressing the neural network based on the pruning to the plurality of banks.

20. The non-transitory computer program product according to claim 19, wherein the set of weight parameters comprises a weight matrix, and the dividing a set of weight parameters in a neural network into a plurality of banks comprises:

dividing each row in the weight matrix into a predetermined number of equal-sized banks; and obtaining the plurality of banks based on the dividing to each row in the weight matrix.

* * * * *